(12) United States Patent
Liu

(10) Patent No.: US 7,496,497 B2
(45) Date of Patent: Feb. 24, 2009

(54) METHOD AND SYSTEM FOR SELECTING WEB SITE HOME PAGE BY EXTRACTING SITE LANGUAGE COOKIE STORED IN AN ACCESS DEVICE TO IDENTIFY DIRECTIONAL INFORMATION ITEM

(75) Inventor: Tsung-Chun Liu, Cupertino, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 902 days.

(21) Appl. No.: 10/741,579

(22) Filed: Dec. 18, 2003

(65) Prior Publication Data
US 2005/0137873 A1 Jun. 23, 2005

(51) Int. Cl.
G06F 17/28 (2006.01)

(52) U.S. Cl. .............................. 704/3; 704/2
(58) Field of Classification Search .............. 704/2, 704/3
See application file for complete search history.

(56) References Cited

U.S. PATENT DOCUMENTS

| | | | | |
|---|---|---|---|---|
| 6,119,078 | A * | 9/2000 | Kobayakawa et al. | 704/3 |
| 7,113,960 | B2 * | 9/2006 | Goldfuss et al. | 707/104.1 |
| 7,174,289 | B2 * | 2/2007 | Sukehiro | 704/7 |
| 7,194,411 | B2 * | 3/2007 | Slotznick et al. | 704/271 |
| 7,216,072 | B2 * | 5/2007 | Kasai et al. | 704/8 |
| 2002/0091509 | A1 * | 7/2002 | Zoarez et al. | 704/6 |
| 2002/0099545 | A1 | 7/2002 | Levitt et al. | |
| 2002/0111967 | A1 * | 8/2002 | Nagase | 707/513 |
| 2002/0123879 | A1 * | 9/2002 | Spector | 704/2 |
| 2002/0138649 | A1 * | 9/2002 | Cartmell et al. | 709/245 |
| 2004/0010596 | A1 * | 1/2004 | Hui | 709/228 |
| 2004/0044518 | A1 * | 3/2004 | Reed et al. | 704/8 |
| 2004/0205671 | A1 * | 10/2004 | Sukehiro et al. | 715/532 |

FOREIGN PATENT DOCUMENTS

| | | | |
|---|---|---|---|
| EP | 1 258 819 | * | 11/2002 |
| JP | 501030 | | 9/2002 |

* cited by examiner

Primary Examiner—Talivaldis I Smits
(74) Attorney, Agent, or Firm—Duane Morris LLP

(57) ABSTRACT

A method and system provide for selecting a web site home page in a desired language. The method comprises identifying within a web address request a directional information item by extracting from the request a site language cookie stored in a user's access device, providing a web page associated with the web address to a second web site corresponding to the directional information item wherein the second web site includes a language translator, translating the web page textual information in accordance with the language translator and returning the translated web page to the user. The method further provides for accessing a control table to determine a status of the web page and obtaining a version of the web page stored locally on the second site or otherwise obtaining a current version of the web page; and translating the obtained web page.

10 Claims, 3 Drawing Sheets

METHOD AND SYSTEM FOR SELECTING WEB SITE HOME PAGE BY EXTRACTING SITE LANGUAGE COOKIE STORED IN AN ACCESS DEVICE TO IDENTIFY DIRECTIONAL INFORMATION ITEM

FIELD OF THE INVENTION

This application is related to the field of network page management and more specifically to a method and system for dynamically establishing a web site home page in a desired language.

BACKGROUND OF THE INVENTION

Since its advent, the use of public networks, such as the Internet and the World Wide Web (www), has become a significant tool for companies to distribute information regarding their products and services. Many companies that sell or advertise their products to the general public, whether locally or in the international community, commonly use a portal homepage that allows their customers to view the contents of the entire web site in a particular language. Conventionally, the portal homepage is in a language that is classified as a default language and the user is provided with a link to a homepage in a then desired language. Hence, a user must first sign on to the web site and then select a particular or desired language homepage before obtaining information regarding the company's products or services.

While this method enables the company to respond to local language desires, the maintenance of the web page in multiple languages is a significant burden on company resources. When products or services are changed, added or deleted, associated web pages, in each language, must be updated to reflect such changes.

Accordingly, there is a need for a method and a system for reducing the burden imposed by multiple language web sites and the ability to simplify the updating of such web sites.

SUMMARY OF THE INVENTION

A method and system to allow a user to select a web site home page in a desired language is disclosed. The method comprises the steps of identifying within a web address request a directional information item, providing a web page associated with the web address to a second web site corresponding to said directional informational item, wherein the second web site includes a language translator, translating the web page textual information in accordance with the language translator and returning the translated web page to the user. The method further comprises the steps of accessing a control table to determine a status of the web page and obtaining a version of the web page stored locally on the second site, when said status indicates said web page is locally stored and valid, otherwise obtaining a current version of the web page; and translating the obtained web page.

Figure 1:
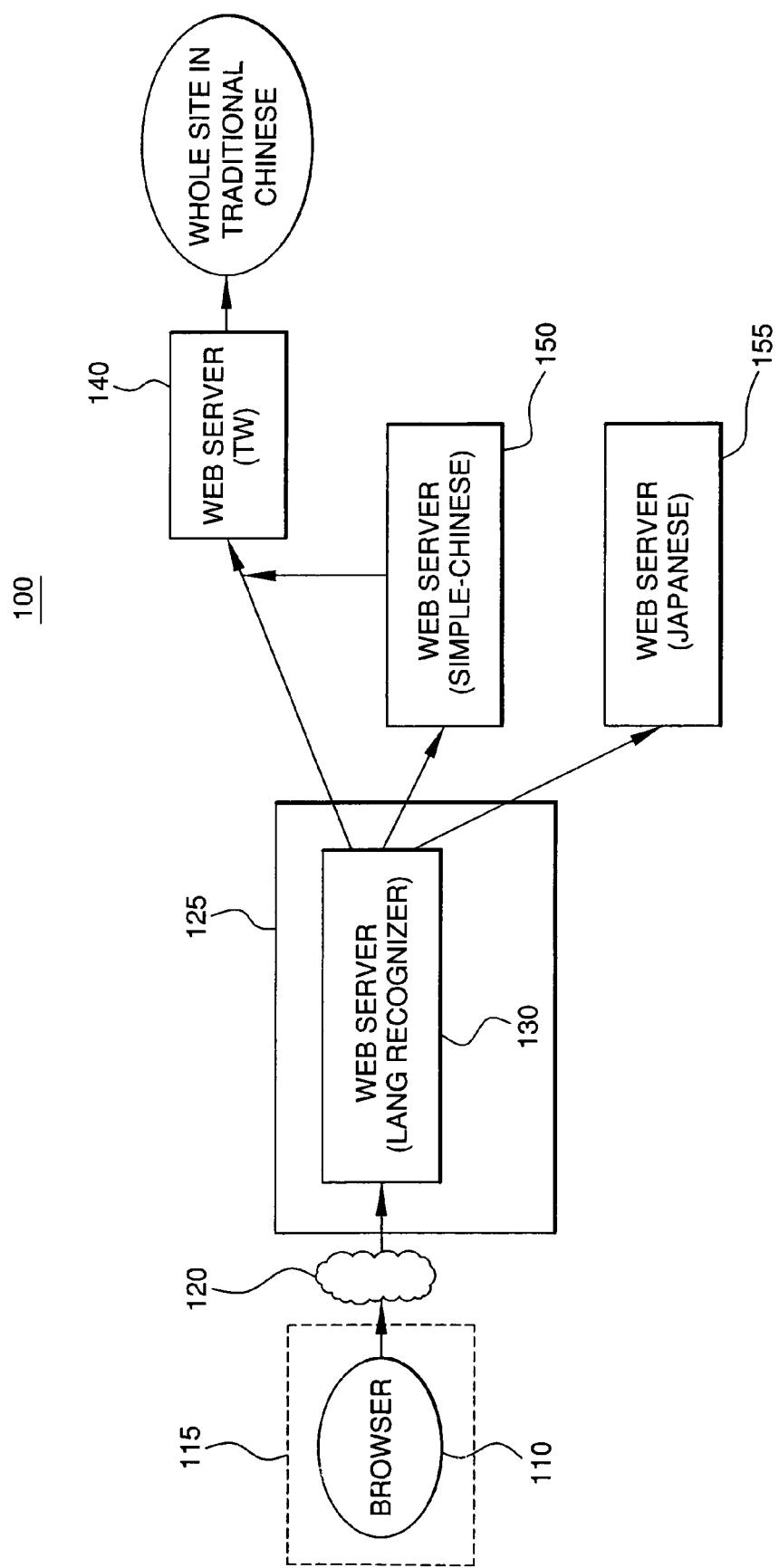
FIG. 1 illustrates a block diagram of an exemplary process for selecting desired homepage language in accordance with the principles of the invention.

It is to be understood that these drawings are solely for purposes of illustrating the concepts of the invention and are not intended as a definition of the limits of the invention. The embodiments shown in FIGS. 1-3 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

FIG. 1 illustrates a block diagram of an exemplary process 100 for selecting desired homepage language in accordance with the principles of the invention. In this exemplary process, browser software 110 on client computer 115 transmits a request, using a web address or a URL, over network 120 to server 125. Server 125, in this case, is representative of a proxy to the host web designated in the transmitted address or URL. Server 125 includes language recognizer software 130 that extracts information from the address or URL and directs the request based on the information extracted from the request. More specifically, the language recognizer software 130 determines whether information in the request is associated with a site language cookie that has previously been stored on client computer 115. Cookie technology is well known in the art of networking and need not be discussed in detail herein.

If language recognizer software 130 determines that site language cookie information is not available, the request is directed to a default web site 140. In this illustrated case, the default web site 140 is maintained in a traditional Chinese language 145. However, if the language recognizer software 130 determines site language cookie information is available, then the request is directed to the appropriate language virtual web site, shown as web sites 150 and 155. In this illustrative case site 150 may be associated with a web site that is maintained in a simple Chinese language while site 155 may be associated with a web site maintained in Japanese. Although only two alternate language web sites are shown, it would be recognized by those skilled in the art that the present invention is not limited to only the two sites shown but many contain any number of alternate language web sites.

Figure 2:
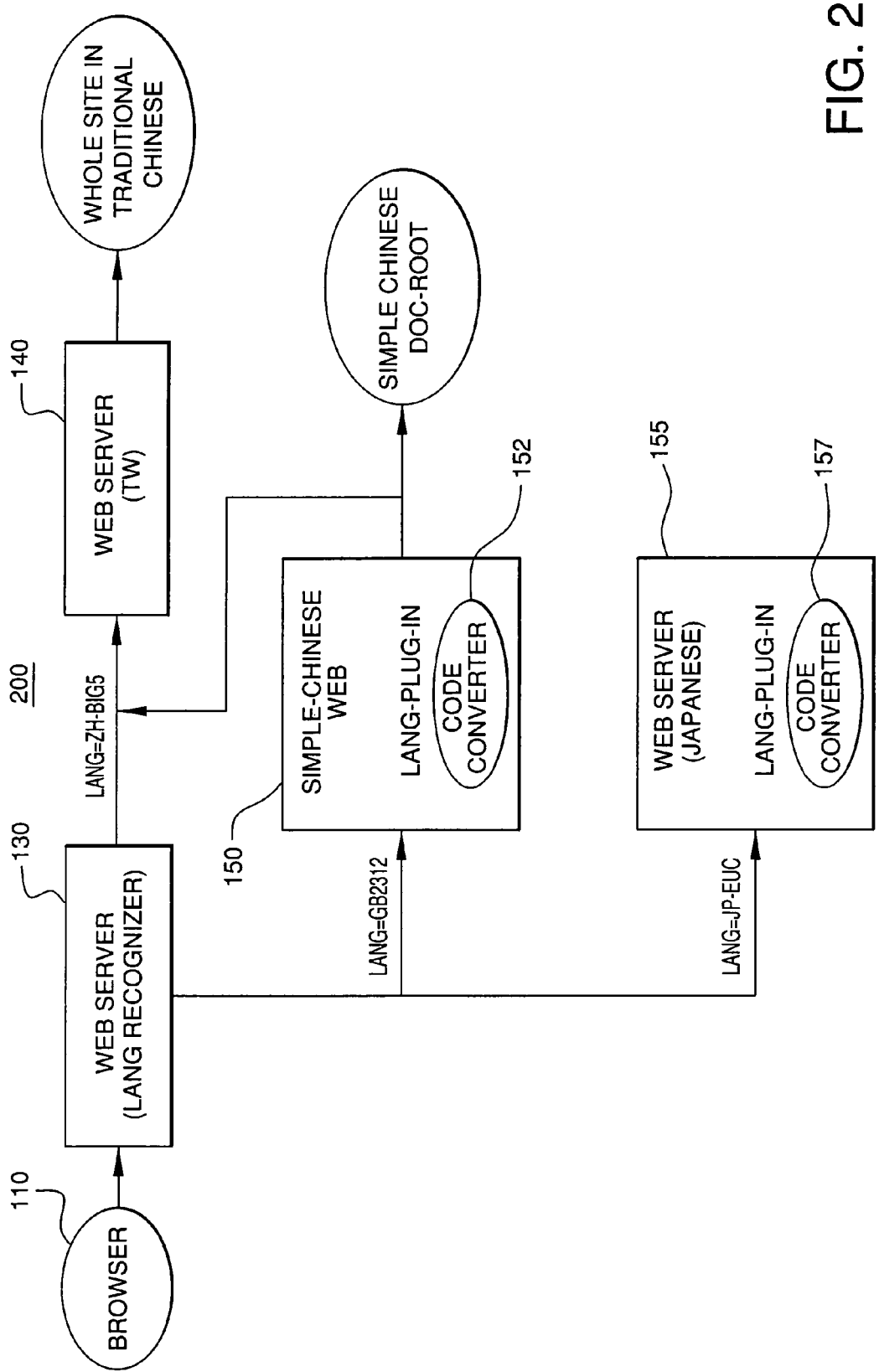
FIG. 2 illustrates in further detail the processing shown in FIG. 1.

FIG. 2 illustrates in further detail processing 100 shown in FIG. 1. In this case, browser software 110 provides a request to web server language recognizer software 130 as previously discussed. Language recognizer software 130 extracts desired data from the address and language information from a URI table (not shown), which provides information regarding the desired web page and includes information regarding addresses of alternate web sites or instructions that provide direction regarding language conversion processing. For example, the URI table may include information that a desired web page is stored on a local web server (i.e., local mode) and this page is not suitable for language translation or conversion. In another aspect, the URI table may indicate that a desired web page is always obtained from a language converter program. Furthermore, in one case, the web page may be referred to a "no-cache" page as the desired web page may change. In another case, the ability to access the desired web page may have expired and must again be read. In this case, access to the desired web page may be made through information stored in a "cache" memory and is referred to as a "cache" page.

As would be appreciated, the language recognizer software may be resident on the proxy server 125 or on a second server (not shown). Dependent upon the desired language information, a basic web page may be provided as represented by web server or site 140, as in this illustrated example, when the desired language information in the URI table is determined to be "ZH-BIG5". However, if the desired language information is determined to be "GB2312" or "JP-EUC," the request is directed to either web site 150, e.g., simple Chinese, or web site 155, e.g., Japanese, respectively. Web sites 150 and 155 may further include language plug-in software 152 and 157, respectively. Language plug-in software is operable to translate or convert the information on a provided basic web page to the appropriate language. The converted web page is then provided to the browser software 110 for viewing on the user's computer.

Figure 3:
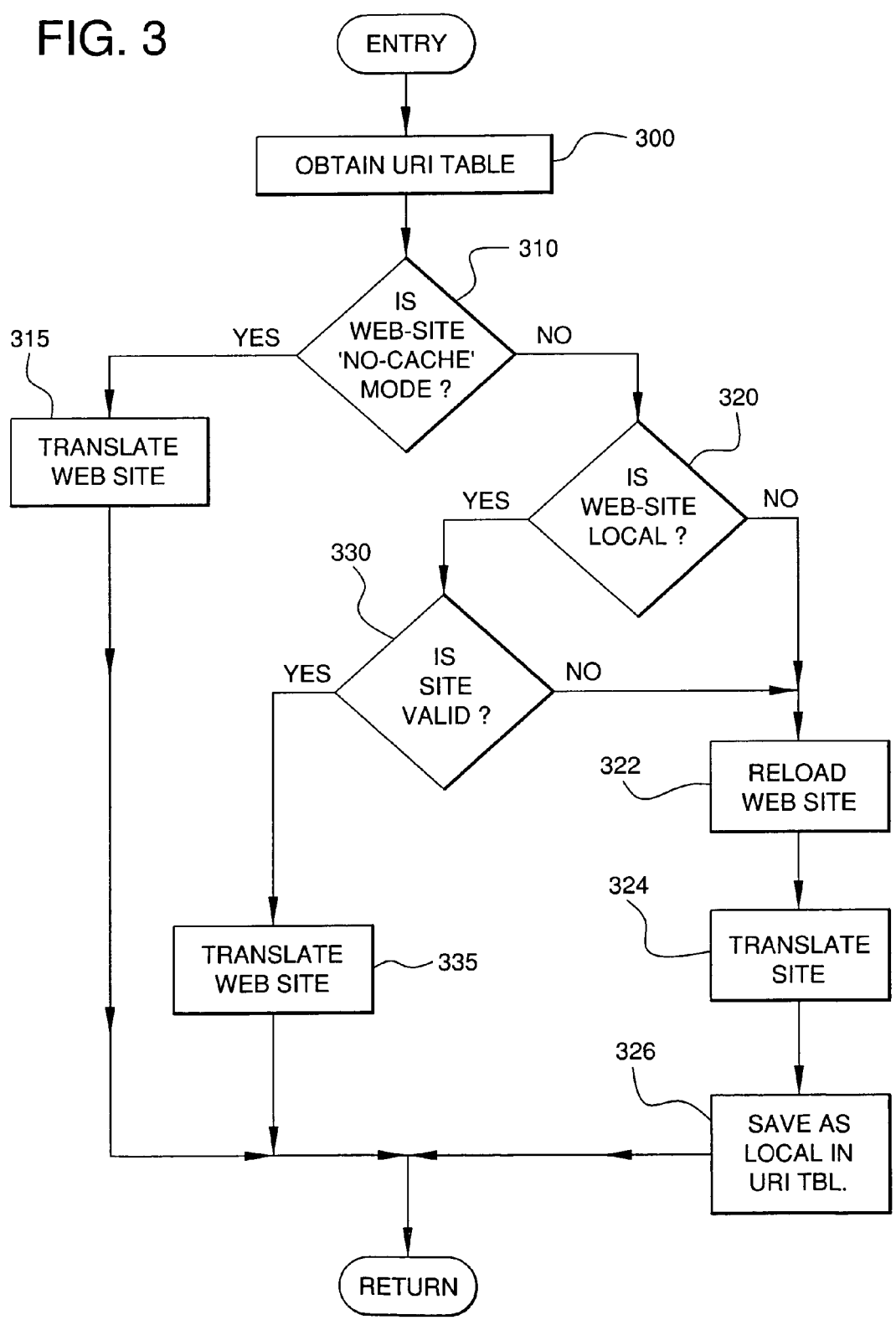
FIG. 3 illustrates a flow chart providing detail of the processing shown in FIGS. 1 and 2; and 3.

FIG. 3 illustrates a process 300 that provides further detail of the processing shown in FIGS. 1 and 2. In this case, when a URI attribute table is received at the web site containing a language conversion plug-in, the URI attribute table is analyzed to determine a next process step.

If the URI attribute table indicates that the desired web site is a "no-cache mode" site, at block 310, then the existing web page received from the web server is translated into the appropriate language, at block 315, and returned to browser software 110. If, however, it is not a "no-cache mode" site, a determination is made at block 320 whether the web site associated with the URI is local to the web site. If the web site is not indicated to be local, then the web page is reloaded at block 322, translated at block 324 and saved as a local entry at block 326.

However, if the web site is indicated to be local, a determination is made at block 330 whether the locally stored web site is still valid. For example, the determination may check whether the time the local file was last modified is less than a storage time associated with the base web page. If the local is valid then the file is translated at block 335 and returned to browser software. Otherwise, the base web page is reloaded, translated and returned to browser software.

In another aspect of the process shown in FIG. 1, the URI attribute table may be updated periodically, preferably on an hourly basis. This periodic update process allows an administrator or web master to manually update the URI attribute table for different purposes. For example, pages may be personalized or different style pages may be used as local pages. In this periodic update, the modification time of base web pages may also be updated.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method to allow a user to select a web site home page in a desired language comprising the steps of:

identifying within a web address request to said web site a directional information item by extracting from said request a site language cookie stored in said user's access device;

providing a web page associated with said web address to a second web site corresponding to said directional informational item, wherein said second web site includes a language translator;

translating information on said web page in accordance with said language translator; and returning said translated web page to said user.

2. The method as recited in claim 1, wherein the step of translating further comprises the steps of:

accessing a control table to determine a status of said web page; and accessing a version of said web page stored locally on said second web site, when said status indicates said web page is locally stored and valid;

otherwise obtaining a current version of said web page; and translating said obtained web page.

3. The method as recited in claim 2, further comprising the step of:

storing said obtained web page locally; and updating said control table to indicate local availability.

4. The method as recited in claim 3, further comprising the step of:

indicating a time when said obtained web page is stored.

5. A system to allow a user to select a web site home page in a desired language comprising:

a processor in communication with a memory, said processor operable to execute code for:

identifying within a web address request to said web site a directional information item by extracting from said request a site language cookie stored in said users access device;

providing a web page associated with said web address to a second web site corresponding to said directional information item, wherein said second web site includes a language translator;

translating information on said web page in accordance with said language translator; and returning said translated web page to said user.

6. The system as recited in claim 5, wherein said processor is further operable to execute code for:

accessing a control table to determine a status of said web page; and accessing a version of said web page stored locally on said second site, when said status indicates said web page is locally stored and valid;

otherwise obtaining a current version of said web page; and translating said obtained web page.

7. The system as recited in claim 6, wherein said processor is further operable to execute code for:

storing said obtained web page locally; and updating said control table to indicate local availability.

8. The system as recited in claim 7, wherein said processor is further operable to execute code for:

indicating a time when said obtained web page is stored.

9. The system as recited in claim 5, further comprising;

an input/output device in communication with said processor.

10. The system as recited in claim 5, wherein said code is stored in said memory.

\* \* \* \* \*

UNITED STATES PATENT AND TRADEMARK OFFICE
CERTIFICATE OF CORRECTION

PATENT NO.       : 7,496,497 B2
APPLICATION NO.  : 10/741579
DATED            : February 24, 2009
INVENTOR(S)      : Tsung-Chun Liu Page 1 of 1

It is certified that error appears in the above-identified patent and that said Letters Patent is hereby corrected as shown below:

Column 1, line 67, replace "FIGS. 1 and 2; and 3." with --FIGS. 1 and 2.--
Column 4, line 34, replace "users" with --user's--

Signed and Sealed this

Nineteenth Day of May, 2009

JOHN DOLL
*Acting Director of the United States Patent and Trademark Office*